United States Patent [19]

Rodreguez

[11] Patent Number: 5,100,681
[45] Date of Patent: Mar. 31, 1992

[54] PROCESS FOR PREPARING PIMIENTO PASTE FOR STUFFING PITTED OLIVES

[76] Inventor: Angel A. Rodreguez, Av. Reyes Catolicos No. 16, DOS, Hermanas (Sevilla), Spain

[21] Appl. No.: 666,740

[22] Filed: Mar. 8, 1991

[30] Foreign Application Priority Data

Mar. 9, 1990 [ES] Spain .................................... 9000719

[51] Int. Cl.$^5$ .............................................. A23P 1/10
[52] U.S. Cl. .................................... 426/276; 426/282; 426/575; 426/615
[58] Field of Search ................ 426/615, 575, 276, 282

[56] References Cited

U.S. PATENT DOCUMENTS

| | | | |
|---|---|---|---|
| 3,962,474 | 6/1976 | Smith | 426/282 |
| 4,006,256 | 2/1977 | Kyros | 426/282 |
| 4,168,325 | 9/1979 | Gonzalez | 426/573 |
| 4,197,325 | 4/1980 | Ono | 426/573 |
| 4,296,140 | 10/1981 | Jaquith | 426/282 |
| 4,503,084 | 3/1985 | Baird | 426/573 |
| 4,563,366 | 1/1986 | Baird | 426/574 |
| 4,564,530 | 1/1986 | Hughelshofer | 426/573 |
| 4,663,174 | 5/1987 | Pina | 426/282 |

Primary Examiner—Carolyn Paden
Attorney, Agent, or Firm—Banner, Birch, McKie & Beckett

[57] ABSTRACT

A process for making a pimento paste is disclosed. Here pimento paste is formed from ground pimento, water, sodium alginate and guar gum. Next the formed balls are dropped into a gelling bath which contains calcium chloride.

4 Claims, No Drawings

PROCESS FOR PREPARING PIMIENTO PASTE FOR STUFFING PITTED OLIVES

BACKGROUND OF THE INVENTION

The present invention refers to a process for preparing pimiento paste shaped into balls to be used for stuffing table olives.

Olives stuffed with pimiento are a very well-known commercial product. The primitive technology for producing them basically required pitting the olives to leave a cavity in their center. This cavity is stuffed with a piece of natural pimiento. The piece was usually rectangular, flat and would have a thickness that principally depended on the size of the green olive and cavity left therein when removing the pit from it. However, this technique caused a great waste of pimiento since the pieces of pimiento had to be of a relatively particular size and shape in order to be inserted neatly and compactly into the cavity of the olive. Furthermore, this technique was labor-intensive with the resultant increases in production costs, as well as excessive hand contact with the products handled in the operations of gathering the strips of pimiento folded in two and then inserting them into the pitted olives.

To solve these difficulties, a method was later developed to produce pimiento paste in the form of a ribbon that could be used in automatic olive-stuffing machines. This method basically consisted of macerating the natural pimiento, for example, by mincing it until the particle size formed a dispersion in an aqueous medium that contained alginic acid (or a salt thereof suitable for ingestion) and guar gum. The dispersion is suitably shaped to be inserted into a pitted olive and, preferably, to be used in a conventional automatic stuffing machine, although the shaped dispersion may be later cut for this purpose. The dispersion is placed in contact with a solidifying solution of a water-soluble compound suitable for ingestion having a bivalent cation, preferably calcium chloride, whereby the alginic acid gels irreversibly to form reconstituted pimiento that retains its shape. This solidification procedure establishes the properties required for manipulating and stuffing with automatic stuffing machines.

The shaping and mincing operations may be carried out by transferring this dense homogeneous dispersion to a conveyor belt that travels semisubmerged through a channel containing a solution of calcium chloride. Once the belt has completed its course, the resulting wide ribbon of pimiento continues to thicken as it floats along the channel and is picked up at the end of it by another conveyor belt. The solidified mass then moves on to the cutting operation in cutting devices to give the ribbon of pimiento the desired width and length and is then stored until it is directly used to stuff olives.

Generally, this latter technique is the one that is being used today to stuff olives with pimiento paste with good results but also with certain difficulties arising principally from the inelegant manipulation of the ribbon of pimiento paste and the relatively slow rate at which the olives are stuffed.

SUMMARY OF THE INVENTION

According to the present invention, surprisingly, it has now been found that the pimiento paste can be prepared with a configuration that allows for much easier manipulation and quite a faster stuffing rate in comparison with the ribbon-shaped pimiento paste according to the current state of the art.

Therefore, the present invention provides an improved process for shaping pimiento paste into balls, using conventional components used up till now in the preparation of the paste for stuffing olives, which leads to results superior to those obtained by the previous technique, basically with regard to the ease with which the pimiento-paste balls are manipulated and the greater stuffing rate that can be attained with said paste shaped into balls.

Specifically, the procedure of this invention, generally speaking, follows the operations for preparing the pimiento pulp already known in the state of the art, but it differs from the foregoing with regards to the operation of shaping said pulp.

In this way, the procedure for shaping the pimiento pulp into the shape of spheres or balls, as defined in the invention, comprises dropping in a free fall dosed amounts, which depend on the size of the pitted cavity of the olive to be stuffed, of a fluid, semiliquid paste of ground natural pimiento, water, sodium alginate and guar gum into a bath containing a gelling solution of the fluid paste, preferably an aqueous solution of calcium chloride, with the dosed amounts of paste submerged into said gelling bath, whereby the sodium alginate of the paste becomes calcium alginate, which gels upon contact with the water.

The fact that measured amounts of the pimiento paste, with the above-mentioned composition, are dropped into the gelling bath with the subsequent gelling reaction causes compact pimiento-paste balls of an elastically deformable nature to be obtained, which allows for easier manipulating of the balls and a higher rate at which said balls are stuffed into pitted olives.

I claim:

1. Process for shaping pimiento paste for stuffing pitted olives, said process comprising:
    forming a pimiento paste from ground natural pimiento, water, sodium alginate and guar gum;
    forming said paste into balls by dropping in a free fall measured amounts of said paste into a gelling bath comprising calcium chloride whereby the paste forms a spherical shape and gels.

2. A process as defined in claim 1 wherein the measured amounts of said paste correspond to a volume approximately equal to the volume of a pit removed from an olive.

3. A process for stuffing olives by a process comprising:
    forming a pimiento paste comprising ground natural pimiento, water, sodium alginate and guar gum into spherically shaped balls by dropping measured amounts of paste into a gelling bath comprising calcium chloride and recovering gelled balls of pimiento paste; and
    inserting the balls of pimiento paste into an olive from which the pit has been removed.

4. A process as defined in claim 3 wherein the measured amounts of paste correspond to a volume approximately equal to the volume of the pit removed from the olive.

* * * * *